United States Patent

Homan et al.

(10) Patent No.: US 7,549,497 B2
(45) Date of Patent: Jun. 23, 2009

(54) FOUR-WHEEL DRIVE VEHICLE RUNNING NORMALLY AND WITH OBJECT TOWED THEREBY

(75) Inventors: Akinori Homan, Toyota (JP); Satoshi Munakata, Nishikamo-gun (JP); Yoshiyuki Aoyama, Nishio (JP); Kazutaka Noguchi, Ichinomiya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 476 days.

(21) Appl. No.: 11/399,436

(22) Filed: Apr. 7, 2006

(65) Prior Publication Data

US 2006/0231314 A1      Oct. 19, 2006

(30) Foreign Application Priority Data

Apr. 14, 2005   (JP)   ............................. 2005-116655

(51) Int. Cl.
*B60K 17/34* (2006.01)
(52) U.S. Cl. ................. 180/233; 180/247; 180/248; 180/249; 701/89; 701/94
(58) Field of Classification Search ............. 180/233, 180/244, 247, 248, 249; 701/69, 89, 94
See application file for complete search history.

(56) References Cited

U.S. PATENT DOCUMENTS

| 4,995,862 | A   | * | 2/1991 | Arocha ..................... 475/86 |
| 6,865,468 | B2  | * | 3/2005 | Lin et al. ................... 701/41 |
| 7,349,776 | B2  | * | 3/2008 | Spillane et al. ............. 701/36 |

FOREIGN PATENT DOCUMENTS

JP          2003-14100       1/2003

* cited by examiner

*Primary Examiner*—Paul N Dickson
*Assistant Examiner*—Jacob Knutson
(74) *Attorney, Agent, or Firm*—Oblon, Spivak, McClelland, Maier & Neustadt, P.C.

(57) ABSTRACT

A vehicle includes a wheel speed sensor sensing a vehicle speed V, a 2WD/4WD switch operative to input an instruction to switch between a two-wheel driving state and a four-wheel driving state, a transfer and an actuator switching the two-wheel driving state and the four-wheel driving state, and an ECU driving the actuator. The ECU instructs the actuator to switch from the four-wheel driving state to the two-wheel driving state regardless of the switching instruction from the 2WD/4WD switch if the vehicle tows a trailer and runs in the four-wheel driving state when the vehicle speed exceeds a predetermined value. Consequently, it is possible to provide a four-wheel drive vehicle capable of running while towing an object and also avoiding an increase in the size of the peripheral parts of driving wheels.

16 Claims, 6 Drawing Sheets

FOUR-WHEEL DRIVE VEHICLE RUNNING NORMALLY AND WITH OBJECT TOWED THEREBY

This nonprovisional application is based on Japanese Patent Application No. 2005-116655 filed with the Japan Patent Office on Apr. 14, 2005, the entire contents of which are hereby incorporated by reference.

BACKGROUND OF THE INVENTION

1. Field of the Invention

The present invention relates to a four-wheel drive vehicle, and particularly to a four-wheel drive vehicle running both normally and with an object towed thereby.

2. Description of the Background Art

One of the purposes of the use of vehicles such as a SUV (sport utility vehicle) and a pickup truck is to run towing a trailer, a camping car or a cart loading a boat thereon which is coupled to the back of the vehicle.

Japanese Patent Laying-Open No. 2003-014100 discloses a technology aiming to increase durability of a transmission by engaging a lock-up clutch in a varied amount when it is determined that a vehicle tows a trailer and so on.

FIG. 6 is a diagram for illustrating a run while towing an object.

As shown in FIG. 6, when a vehicle 501 runs towing a trailer 502 coupled to the back of the vehicle, a higher driving torque than that in the normal run is transmitted to driving parts in the vehicle according to the towing operation.

Some of such vehicles employ a so-called part-time 4WD system which is capable of switching between a two-wheel drive mode having good gas mileage suitable for running in a normal mode on a dry road surface with high stability and a four-wheel drive mode suitable for running in the rain and snow or on a rough road.

In such a four-wheel drive vehicle capable of switching the driving state from the two-wheel drive mode to the four-wheel drive mode, driving parts of driving wheels driving only in the 4WD mode also need to be designed for towing. This may lead to an increase in size of peripheral parts of the driving wheels.

Furthermore, when a four-wheel drive vehicle with a center differential runs while towing an object in a four-wheel driving state, as shown in FIG. 6, owing to an applied force F1, a pressurizing force F3 which is applied to rear wheels becomes greater than a pressurizing force F2 applied to front wheels. This may cause a change in diameters between the front tires and the rear tires to lead a full-time differential of the center differential. As a result, durability of the differential may be impaired, and there is a need to solve these problems in towing by a four-wheel drive vehicle.

SUMMARY OF THE INVENTION

An object of the present invention is to provide a four-wheel drive vehicle which is capable of running with an object towed thereby while avoiding an increase in the size of peripheral parts of driving wheels.

In short, the present invention is a four-wheel drive vehicle including a vehicle speed detecting portion detecting a vehicle speed, an input portion inputting an instruction to switch between a two-wheel driving state and a four-wheel driving state, a switching portion switching between the two-wheel driving state and the four-wheel driving state, and a control portion instructing the switching portion to switch from the four-wheel driving state to the two-wheel driving state regardless of the instruction from the input portion if the vehicle tows a trailer and runs in the four-wheel driving state when the vehicle speed exceeds a predetermined value.

Preferably, the four-wheel drive vehicle further includes a switch operated by a driver to designate a towing mode. The control portion detects, based on the setting of the switch, that the vehicle tows a trailer.

Preferably, the four-wheel drive vehicle further includes a gradient sensing portion sensing a vehicle gradient, and an acceleration sensing portion sensing a vehicle acceleration. The control portion detects that the vehicle tows a trailer, based on a current driving force of the vehicle, the current vehicle gradient and the current vehicle acceleration.

Preferably, the four-wheel drive vehicle further includes a pressure sensing portion sensing an air pressure in a front wheel and an air pressure in a rear wheel, and an acceleration sensing portion sensing a vehicle acceleration. The control portion detects that the vehicle tows a trailer, based on the current driving force of the vehicle, the current air pressure in the front wheel, the current air pressure in the rear wheel, and the current vehicle acceleration.

Preferably, the control portion maintains the driving state determined in accordance with the instruction from the input portion when the vehicle speed is less than the predetermined value.

Preferably, the control portion maintains the driving state determined in accordance with the instruction from the input portion without a detection of towing the trailer.

Preferably, the four-wheel drive vehicle further includes a mechanical power source; a rear propeller shaft for driving a rear wheel; and a front propeller shaft for driving a front wheel. The switch unit transfers a torque generated by the power source to only one of the rear propeller shaft and the front propeller shaft in the two-wheel drive state, and transfers the torque generated by the power source to both of said rear propeller shaft and the front propeller shaft in the four-wheel drive state.

More preferably, the mechanical power source is an engine, and the four-wheel drive vehicle further includes a transmission transferring the torque received from the engine to the switch unit.

According to the present invention, by setting the vehicle in the two-wheel drive mode when the vehicle tows a trailer at a vehicle speed above a certain level, it is possible to improve the durability of the driving parts on the side of the driving wheels which are not full-time driving wheels and to optimize those driving parts.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
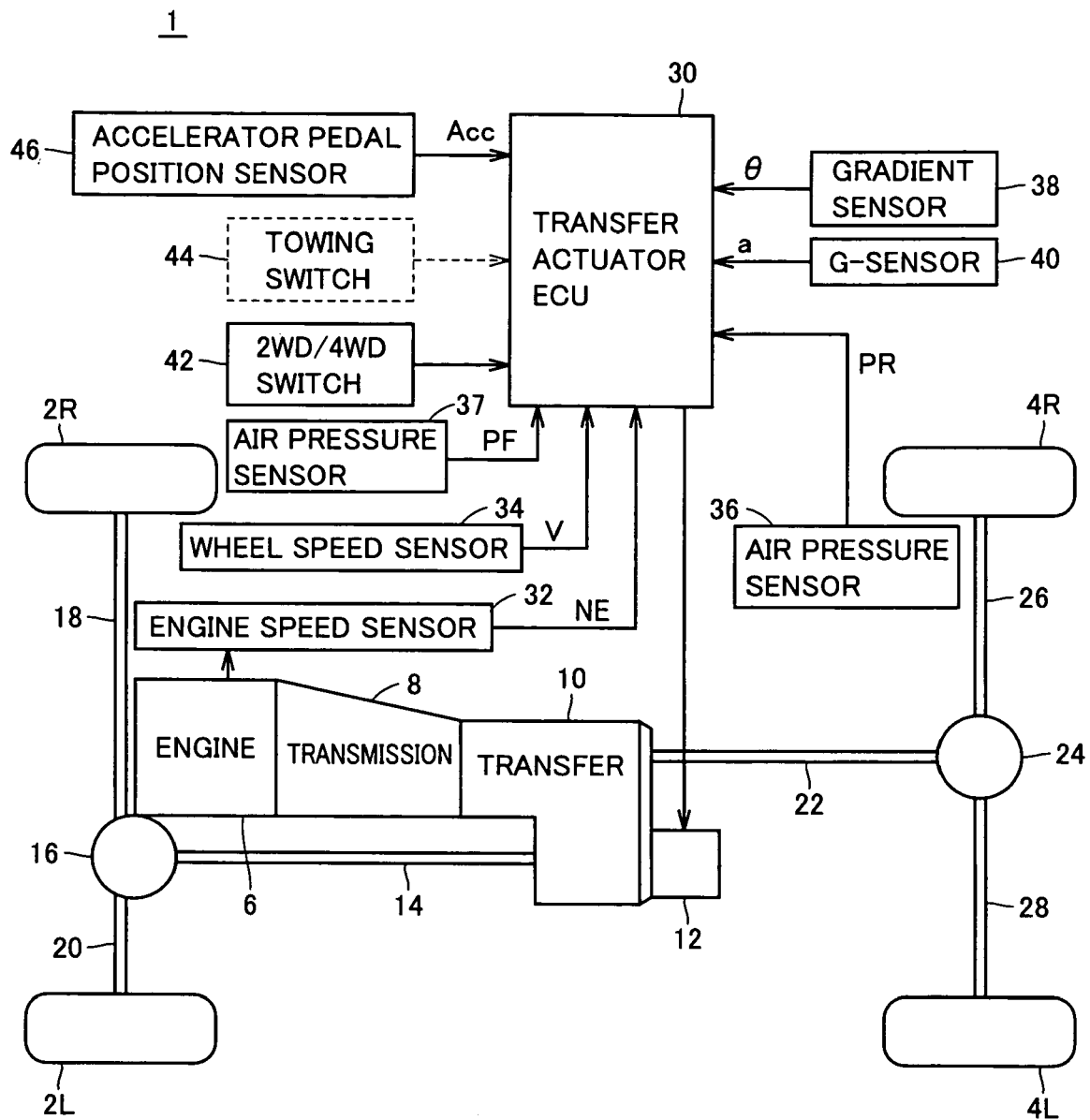
FIG. 1 is a block diagram showing a configuration of a vehicle 1 according to an embodiment of the present invention.

The embodiments of the present invention will be hereinafter described in detail with reference to the accompanying drawings, in which the same or corresponding components are designated by the same reference characters, and the description will not be repeated.

First Embodiment

FIG. 1 is a block diagram showing a configuration of a vehicle 1 according to an embodiment of the present invention.

Referring to FIG. 1, vehicle 1 includes front wheels 2L, 2R, rear wheels 4L, 4R, an engine 6, a transmission 8 and a transfer 10.

Transfer 10 is a part for getting a torque which is transmitted from a powertrain in a base driving mode (a rear wheel drive in FIG. 1) to the wheels which are not originally driving wheels. Vehicle 1 further includes a transfer actuator 12, a front propeller shaft 14, a front differential 16 and front drive shafts 18, 20.

Vehicle 1 further includes a rear propeller shaft 22, a rear differential 24 and rear drive shafts 26, 28.

Transfer 10 has a center differential incorporated therein. Transfer actuator 12 is, for example, an electric motor. In response to the rotation of the motor, a shift fork moves to cause a movement of a sleeve got caught in the shift fork and thereby to switch back and forth between a two-wheel driving state and a four-wheel driving state.

In the two-wheel driving state, transfer 10 transmits the torque from transmission 8 only to rear propeller shaft 22 but not to front propeller shaft 14.

In the four-wheel driving state, transfer 10 transmits the torque transmitted from transmission 8 to both rear propeller shaft 22 and front propeller shaft 14.

Vehicle 1 further includes an engine speed sensor 32 sensing an engine speed NE, a wheel speed sensor 34 sensing a vehicle speed V, an air pressure sensor 37 sensing an air pressure PF in a front wheel and an air pressure sensor 36 sensing an air pressure PR in a rear wheel.

Vehicle 1 further includes a 2WD/4WD switch 42 operative to input an instruction to switch between the two-wheel driving state and the four-wheel driving state, a towing switch 44 operated by a driver to designate a towing mode, an accelerator pedal position sensor 46 sensing an accelerator pedal position ACC, a gradient sensor 38 sensing a vehicle gradient θ, a G-sensor 40 sensing a vehicle acceleration α, and a transfer actuator ECU 30 controlling transfer actuator 12 based on detected values from each sensor and the setting of each switch.

Figure 2:
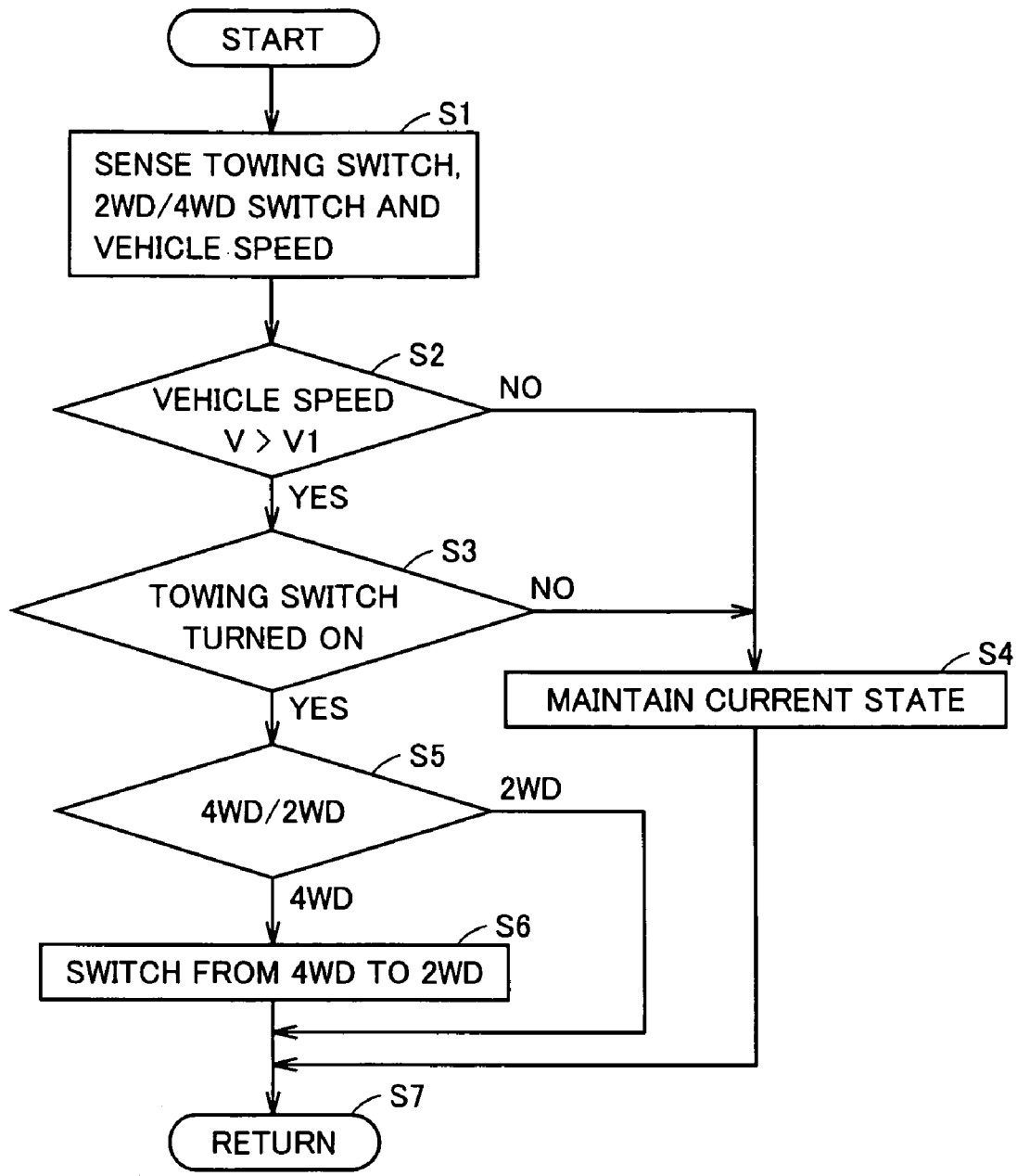
FIG. 2 is a flowchart showing a control structure of a program carried out by a transfer actuator ECU 30 in FIG. 1.

FIG. 2 is a flowchart showing a control structure of a program carried out by transfer actuator ECU 30 in FIG. 1. The process of this flowchart is read from a main routine for implementation every a certain period of time or every time a predetermined condition is fulfilled.

Referring to FIGS. 1 and 2, as the process is first started, transfer actuator ECU 30 captures a setting of towing switch 44, a setting of 2WD/4WD switch 42, and vehicle speed V sensed by wheel speed sensor 34 (step S1).

In step S2, it is then determined whether or not vehicle speed V is greater than a predetermined value V1. If vehicle speed V is greater than V1, the process proceeds to step S3, and if not, the process proceeds to step S4.

In step S3, it is determined whether or not the setting of towing switch 44 is in an ON state, that is, in a towing state. If the switch is in the ON state, the process proceeds to step S5. If the switch is in an OFF state, the process proceeds to step S4.

In step S4, transfer actuator ECU 30 maintains the current state of actuator 12. In other words, if the vehicle runs in a two-wheel drive mode, it continues to run in the two-wheel drive mode. If the vehicle runs in a four-wheel drive mode, it continues to run in the four-wheel drive mode. When step S4 is completed, the process proceeds to step S7.

When the process proceeds from step S3 to step S5, transfer actuator ECU 30 determines, based on the switching state by actuator 12, whether the vehicle currently runs in the four-wheel drive mode or in the two-wheel drive mode.

In step S5, if the vehicle runs in the four-wheel drive mode, the process proceeds to step S6, and ECU 30 controls transfer actuator 12 to switch from the four-wheel drive mode to the two-wheel drive mode regardless of the setting of 2WD/4WD switch 42. When the process of step S6 is completed, the process proceeds to step S7.

On the other hand, in step S5, if actuator 12 is currently set in the two-wheel drive mode, the process proceeds to step S7. In step S7, the control is then returned to the main routine.

In other words, when a vehicle with a part-time 4WD system runs towing an object, a large torque is continuously applied also to a front drivetrain which is not a fill-time drivetrain. In this case, if the vehicle runs in the four-wheel drive mode for a long time, this results in damage to the front drivetrain such as a front propeller shaft, a front differential and a front drive shaft, as well as components for 4WD mode within transfer 10 such as a center differential, a 2/4WD switching gear portion and a chain. In order to avoid the damage, it is necessary to increase the size of the parts to increase durability.

On the other hand, the fact is that towing in the four-wheel drive mode is in most cases utilized for example to pull a boat into and out of the water and drag the vehicle out of a muddy place. Therefore, normally, towing is often performed in the two-wheel drive mode. Accordingly, it is unlikely that the vehicle runs and simultaneously tows an object at high speed in the four-wheel drive mode.

Therefore, in order to avoid running at high speed in the four-wheel driving state for a long time, when vehicle speed V exceeds predetermined value V1, transfer actuator ECU 30 controls actuator 12 to change gears within transfer 10 from the four-wheel drive mode to the two-wheel drive mode even if the driver sets 2WD/4WD switch 42 in the four-wheel drive mode.

This permits preventing damage to front propeller shaft 14, front differential 16, front drive shafts 18, 20 and thereby increasing the life of the parts. In other words, the parts of a drivetrain which is not a full-time drivetrain does not need to be provided with a structure with durability high enough to enable a run while towing an object in the four-wheel drive mode for a long period of time. As a result, it is possible to achieve weight reduction and optimization of the vehicle.

Furthermore, in switching from a four-wheel drive run to a two-wheel drive run in step S6 in FIG. 2, in order to inform the driver of the switching, a warning may be given by a buzzer or a flashing light before switching. In addition, an automatic switching mode and a non-automatic switching mode may be provided to allow the driver to select one of the modes.

Furthermore, in the above-mentioned embodiment, transfer 10 with a center differential is used, but the present invention can be applied to a transfer without a center differential.

Second Embodiment

Figure 3:
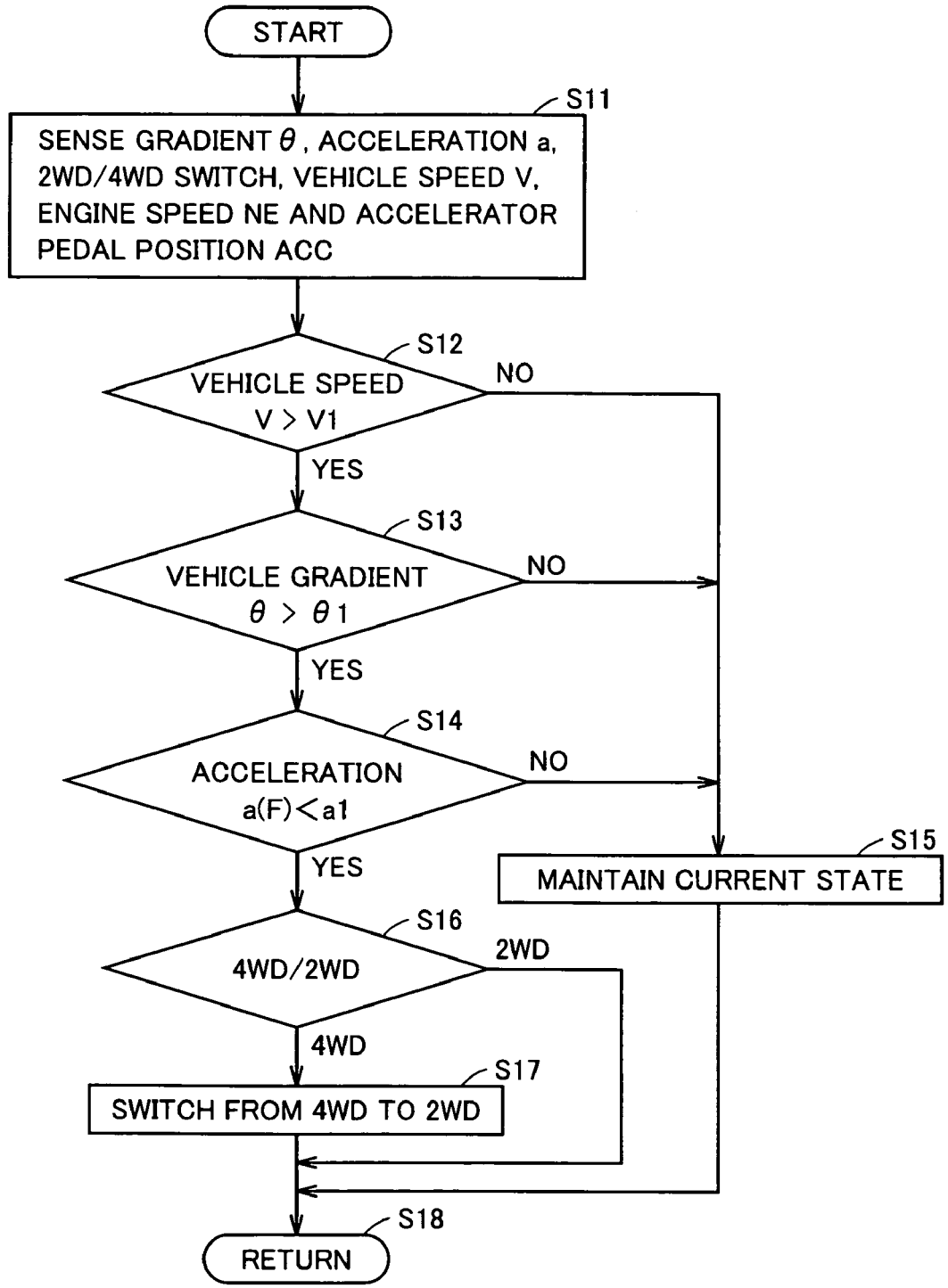
FIG. 3 is a flowchart showing a control structure of a program of transfer actuator ECU 30 carried out in a second embodiment.

FIG. 3 is a flowchart showing a control structure of a program of transfer actuator ECU 30 carried out by a second embodiment.

Referring to FIGS. 1 and 3, first in step S11, a transfer actuator ECU 30 senses a gradient θ, an acceleration α, a setting of a 2WD/4WD switch 42, a vehicle speed V, an engine speed NE and an accelerator pedal position ACC. In step S12, transfer actuator ECU 30 then determines whether vehicle speed V is greater than a predetermined value V1 or not.

If vehicle speed V is greater than V1, the process proceeds to step S13, and if not, the process proceeds to step S15.

In step S13, transfer actuator ECU 30 determines whether gradient θ of the vehicle sensed by a gradient sensor 38 is greater than a predetermined value θ1 or not.

In transfer actuator ECU 30, a table or map representing a relationship between an engine throttle angle and a vehicle speed (and a driving acceleration), and a gradient of the road surface on which the vehicle runs is previously measured or calculated and thus set.

This allows the road surface gradient corresponding to the current throttle angle and vehicle speed (driving acceleration) to be obtained by reading from this table. The table (map) of the road surface gradient set in this way shows values in the case when the vehicle runs in a specified vehicle weight without towing anything, and therefore, permits keeping track of a towing load as a road surface gradient when the vehicle tows a trailer.

For example, when the vehicle runs on a flat road in a state of towing a trailer and so on, it is determined, based on a towing load of the trailer and so on, that the vehicle runs on a climbing road with a predetermined gradient despite that the road is actually flat. Conversely, based on the road surface gradient estimated in this way, it is possible to infer whether the trailer and so on is towed or not. Therefore, it is possible to infer the possibility of the trailer and so on being towed, using the gradient sensor without providing a towing switch.

In step S13, if gradient θ is greater than θ1, the process proceeds to step S14, and if not, the process proceeds to step S15.

In step S14, it is determined whether or not a current acceleration a(F) is less than a predetermined value a1, where acceleration a(F) is an acceleration generated in a vehicle in the case when driving force F is exerted.

Figure 4:
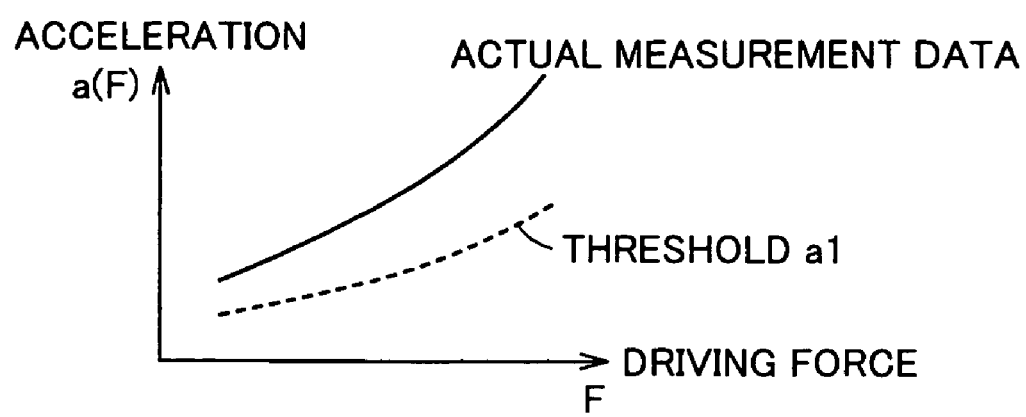
FIG. 4 is a diagram for illustrating a predetermined value a1.

FIG. 4 is a diagram for illustrating predetermined value a1.

Referring to FIG. 4, a threshold is set as a1, which is less than an actual measurement data in the case where the vehicle runs in a specified vehicle weight when the driving force is F. Driving force F of the vehicle represented along a horizontal axis of FIG. 4 is calculated by dividing the product of an engine torque, a transmission gear ratio and a final gear ratio by the radius of a tire. In addition, the engine torque can be read from the map as a function of accelerator pedal position ACC and engine speed NE.

It is to be determined that the vehicle tows a heavy load if the actually detected acceleration is less than threshold a1 which is less than the actual measurement data in the case when driving force F is exerted for the specified vehicle weight, as shown in FIG. 4. In other words, the processes of steps S13 and S14 in FIG. 3 allow towing to be sensed if it is not the case that a towing switch is provided as indicated in FIG. 2 at step 3 and hence its setting can be read.

In step S14, if acceleration a(F) is less than a1, the process proceeds to step S16, and if not, the process proceeds to step S15.

In step S15, the setting of an actuator 12 is maintained as currently set. If the vehicle currently runs in a two-wheel drive mode, it continues to run in the two-wheel drive mode. If the vehicle currently runs in a four-wheel drive mode, it continues to run in the four-wheel drive mode. After step S15, the process proceeds to step S18.

In step S16, it is determined whether the vehicle currently runs in the four-wheel drive mode or in the two-wheel drive mode. If the vehicle currently runs in the four-wheel drive mode, the four-wheel drive mode is switched to the two-wheel drive mode in step S17. This switching is done by controlling actuator 12 by transfer actuator ECU 30 to move a shift folk to thereby cause a switching sleeve to be moved.

In this case, even if 2WD/4WD switch 42 is set in the four-wheel drive mode, the switching is done. The switching may be done after a warning is given by a buzzer or a flashing light and so on.

When the process of step S17 is completed, it proceeds to step S18, and then, the control is returned to the main routine.

It is possible to reduce the weight of a drivetrain which is not a full-time drivetrain also in the second embodiment as in the first embodiment.

Furthermore, in the present embodiment, a road gradient is sensed by a gradient sensor. However, in a vehicle provided with a car navigation system and so on which previously stores road conditions, the road gradient may be sensed based on the stored road conditions. In addition, the road gradient may be sensed based on a relationship between the throttle angle and the acceleration within a predetermined time.

Third Embodiment

Figure 5:
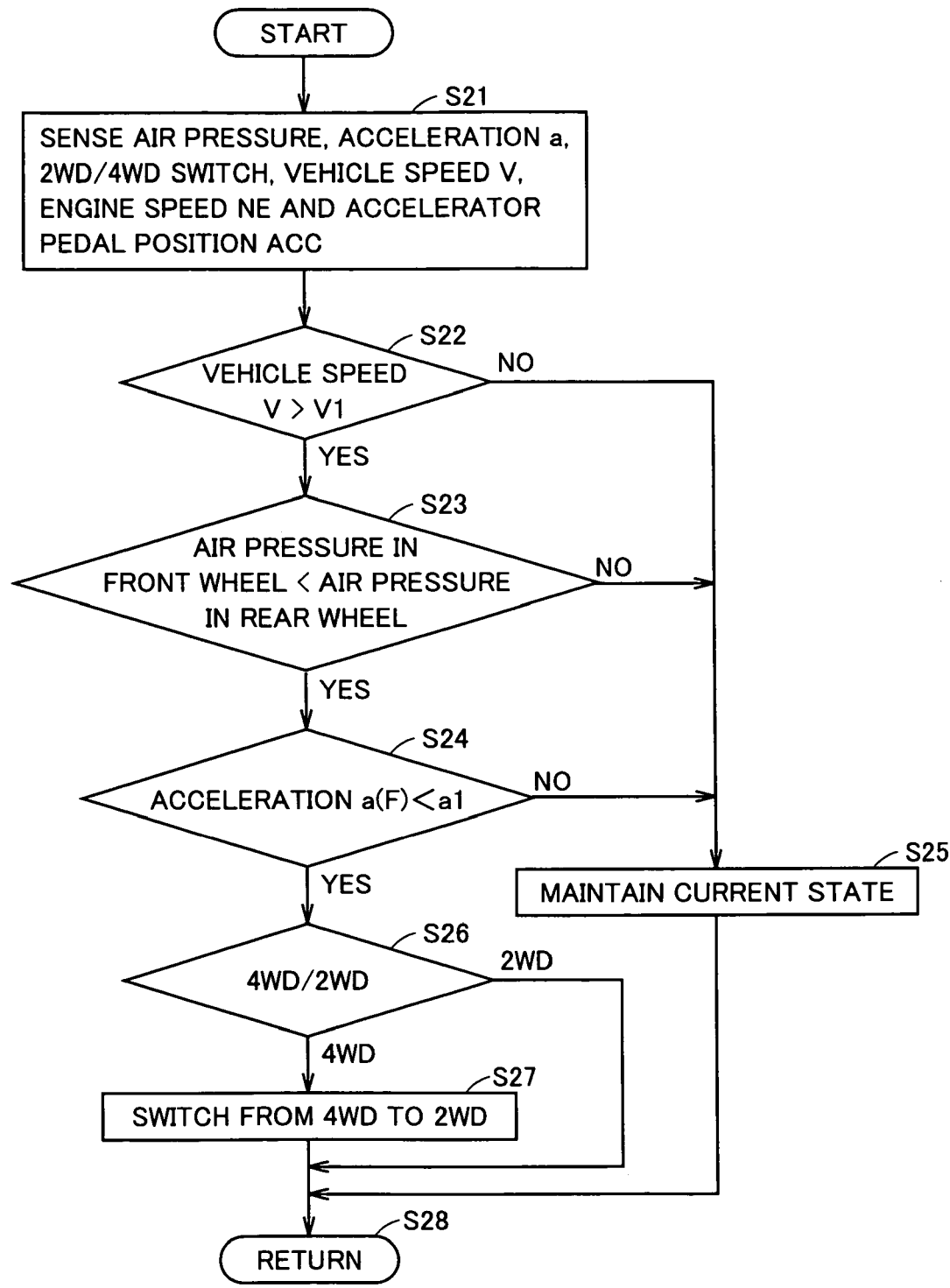
FIG. 5 is a flowchart showing a control structure of a program of transfer actuator ECU 30 carried out in a third embodiment.

FIG. 5 is a flowchart showing a control structure of a program of a transfer actuator ECU 30 carried out in a third embodiment.

Referring to FIGS. 1 and 5, first in step S21, transfer actuator ECU 30 senses air pressures in a front wheel and a rear wheel, an acceleration α, a setting of a 2WD/4WD switch 42, a vehicle speed V, an engine speed NE, and an accelerator pedal position ACC. In step S22, transfer actuator ECU 30 then determines whether vehicle speed V is greater than a predetermined value V1 or not.

If vehicle speed V is greater than V1, the process proceeds to step S23, and if not, the process proceeds to step S25.

Figure 6:
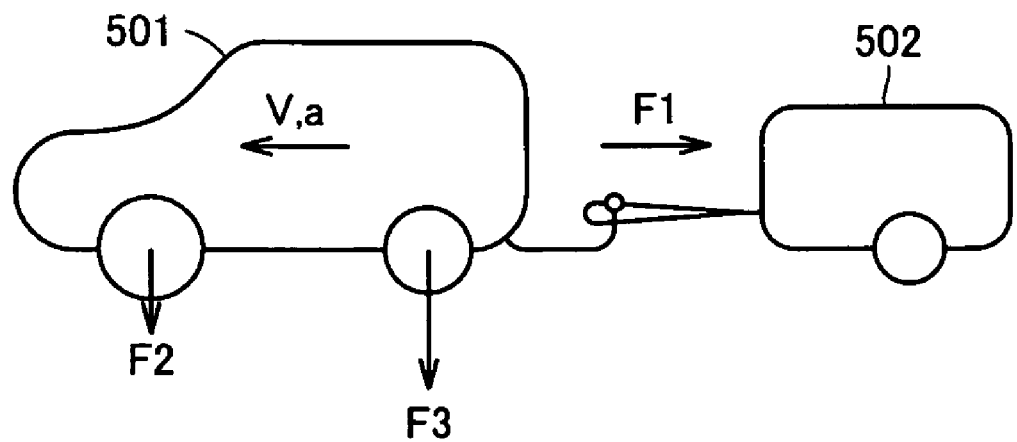
FIG. 6 is a diagram for illustrating a run while towing an object.

In step S23, transfer actuator ECU 30 determines whether or not the air pressure in the rear wheel is greater than the air pressure in the front wheel. As shown in FIG. 6, the air pressure in the rear wheel is greater than the air pressure in the front wheel in towing an object. This suggests that the vehicle is in the towing state.

In transfer actuator ECU 30, a table or map showing a relationship between an engine throttle angle and a vehicle speed (and a driving acceleration) is previously measured or calculated and thus set.

In step S23, if the air pressure in the front wheel is less than the air pressure in the rear wheel, the process proceeds to step S24, and if not, the process proceeds to step S25.

In step S24, it is determined whether the current acceleration a(F) is less than a predetermined value a1 or not, where acceleration a(F) is an acceleration generated in a vehicle in the case when a driving force F is exerted. As already described in FIG. 4, it is to be determined that the vehicle tows a heavy load if the actually detected acceleration is less than the threshold a1 which is less than an actual measurement data in the case where driving force F is exerted for a specified vehicle weight.

In other words, the processes of steps S23 and S24 in FIG. 5 allow towing to be sensed if it is not the case that a towing switch is provided as indicated in FIG. 2 at step 3 and hence its setting can be read.

In step S24, if acceleration a(F) is less than a1, the process proceeds to step S26, and if not, the process proceeds to step S25.

In step S25, the setting of an actuator 12 is maintained as currently set. If the vehicle currently runs in a two-wheel drive mode, it continues to run in the two-wheel drive mode, and if the vehicle currently runs in a four-wheel drive mode, it continues to run in the four-wheel drive mode. After step S25, the process proceeds to step S28.

In step S26, it is determined whether the vehicle currently runs in the four-wheel drive mode or in the two-wheel drive mode. If the vehicle currently runs in the four-wheel drive mode, the four-wheel drive mode is switched to the two-wheel drive mode in step S27. This switching is done by controlling actuator 12 by transfer actuator ECU 30 to move a shift folk to thereby cause a switching sleeve to be moved.

In this case, even if 2WD/4WD switch 42 is set in the four-wheel drive mode, the switching is done. The switching may be done after a warning is given by a buzzer or a flashing light and so on.

When the process of step S27 is completed, it proceeds to step S28, and then, the control is returned to the main routine.

It is possible to reduce the weight of a drivetrain which is not a full-time drivetrain also in the third embodiment as in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A four-wheel drive vehicle, comprising:
   a vehicle speed detecting portion that detects a vehicle speed,
   an input portion that inputs an instruction to switch between a two-wheel driving state and a four-wheel driving state,
   a switching portion that switches between the two-wheel driving state and the four-wheel driving state, and
   a control portion that determines the vehicle is towing a trailer based on a setting of at least one switch or at least one detected sensor value and that instructs said switching portion to switch from the four-wheel driving state to the two-wheel driving state regardless of the instruction from said input portion when the control portion determines that the vehicle is towing the trailer, the vehicle is in the four-wheel driving state, and the vehicle speed exceeds a predetermined value.

2. The four-wheel drive vehicle according to claim 1, wherein the at least one switch includes a towing switch operated by a driver to designate a towing mode, and said control portion determines, based on a setting of said towing switch, that the vehicle is towing the trailer.

3. The four-wheel drive vehicle according to claim 1, further comprising:
   a gradient sensing portion that senses a vehicle gradient, and
   an acceleration sensing portion that senses a vehicle acceleration, wherein the at least one detected sensor value includes the vehicle gradient and the vehicle acceleration and said control portion determines that the vehicle is towing the trailer, based on a driving force of the vehicle, said vehicle gradient, and said vehicle acceleration.

4. The four-wheel drive vehicle according to claim 1, further comprising:
   a pressure sensing portion that senses an air pressure in a front wheel and an air pressure in a rear wheel, and
   an acceleration sensing portion that senses a vehicle acceleration, wherein the at least one detected sensor value includes the air pressure in the front wheel, the air pressure in the rear wheel, and the vehicle acceleration and said control portion determines that the vehicle is towing the trailer, based on a driving force of the vehicle, said air pressure in the front wheel, said air pressure in the rear wheel, and said vehicle acceleration.

5. The four-wheel drive vehicle according to claim 1, wherein
   said control portion maintains the driving state determined in accordance with the instruction from said input portion when the vehicle speed is less than said predetermined value.

6. The four-wheel drive vehicle according to claim 1, wherein
   said control portion maintains the driving state determined in accordance with the instruction from said input portion without a detection of towing the trailer.

7. The four-wheel drive vehicle according to claim 1, further comprising:
   a mechanical power source;
   a rear propeller shaft that drives a rear wheel; and
   a front propeller shaft that drives a front wheel; wherein
   said switching portion transfers a torque generated by said power source to only one of said rear propeller shaft and said front propeller shaft in said two-wheel drive state, and transfers the torque generated by said power source to both of said rear propeller shaft and said front propeller shaft in said four-wheel drive state.

8. The four-wheel drive vehicle according to claim 7, wherein
   said mechanical power source is an engine, and
   said four-wheel drive vehicle further comprises a transmission that transfers the torque received from said engine to said switching portion.

9. A four-wheel drive vehicle, comprising:
   means for detecting a vehicle speed,
   means for inputting an instruction to switch between a two-wheel driving state and a four-wheel driving state,
   means for switching between the two-wheel driving state and the four-wheel driving state, and
   means for controlling said means for switching such that the means for switching switches from the four-wheel driving state to the two-wheel driving state regardless of the instruction from said means for inputting when the means for controlling determines that the vehicle is towing the trailer based on a setting of at least one switch or at least one detected sensor value, the vehicle is in the four-wheel driving state, and the vehicle speed exceeds a predetermined value.

10. The four-wheel drive vehicle according to claim 9, wherein the at least one switch includes a towing switch operated by a driver to designate a towing mode, and said means for controlling determines that the vehicle is towing the trailer based on a setting of said towing switch.

11. The four-wheel drive vehicle according to claim 9, further comprising:

means for sensing a vehicle gradient, and means for sensing a vehicle acceleration, wherein the at least one detected sensor value includes the vehicle gradient and the vehicle acceleration, and said means for controlling determines that the vehicle is towing the trailer, based on a driving force of the vehicle, said vehicle gradient, and said vehicle acceleration.

12. The four-wheel drive vehicle according to claim 9, further comprising:

means for sensing an air pressure in a front wheel and for sensing an air pressure in a rear wheel, and means for sensing a vehicle acceleration, wherein the at least one detected sensor value includes the air pressure in the front wheel, the air pressure in the rear wheel, and the acceleration and said means for controlling determines that the vehicle is towing the trailer, based on a driving force of the vehicle, said air pressure in the front wheel, said air pressure in the rear wheel, and said vehicle acceleration.

13. The four-wheel drive vehicle according to claim 9, wherein said means for controlling maintains the driving state determined in accordance with the instruction from said means for inputting when the vehicle speed is less than said predetermined value.

14. The four-wheel drive vehicle according to claim 9, wherein said means for controlling maintains the driving state determined in accordance with the instruction from said means for inputting without a detection of towing the trailer.

15. The four-wheel drive vehicle according to claim 9, further comprising:

a mechanical power source;

a rear propeller shaft that drives a rear wheel; and a front propeller shaft that drives a front wheel; wherein said means for switching transfers a torque generated by said power source to only one of said rear propeller shaft and said front propeller shaft in said two-wheel drive state, and transfers the torque generated by said power source to both of said rear propeller shaft and said front propeller shaft in said four-wheel drive state.

16. The four-wheel drive vehicle according to claim 15, wherein said mechanical power source is an engine, and said four-wheel drive vehicle further comprises a transmission transferring the torque received from said engine to said means for switching.

* * * * *